Feb. 28, 1933.  S. DEUTSCH  1,899,749
SPRAYING DEVICE
Filed Feb. 25, 1929  3 Sheets-Sheet 1

INVENTOR
SIMON DEUTSCH
BY
Cromwell, Greist & Warden
ATTORNEYS

Feb. 28, 1933. S. DEUTSCH 1,899,749
SPRAYING DEVICE
Filed Feb. 25, 1929 3 Sheets-Sheet 2
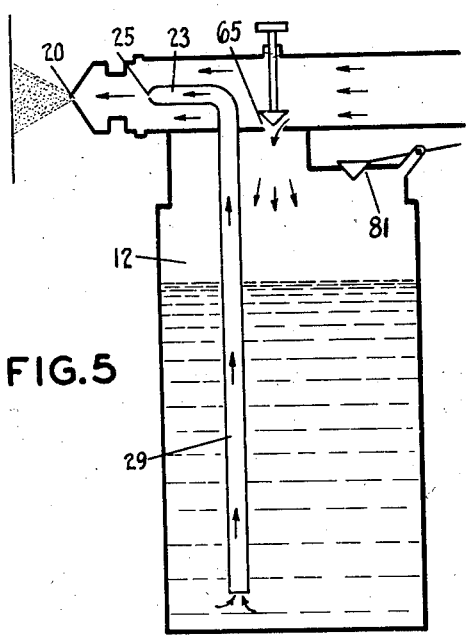
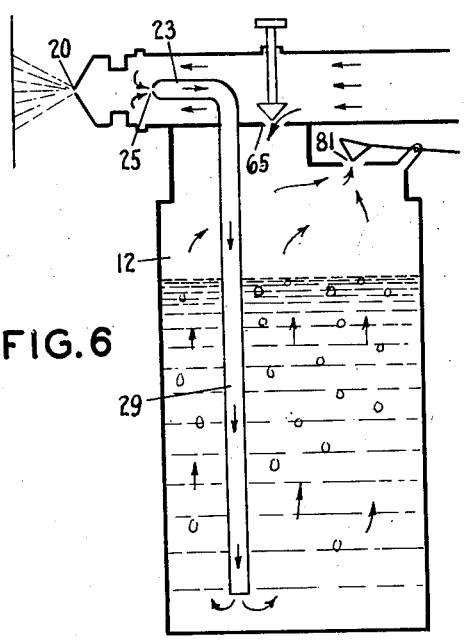
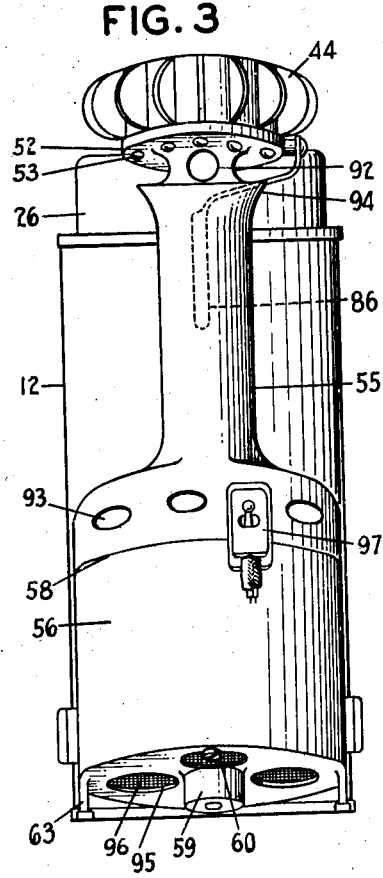
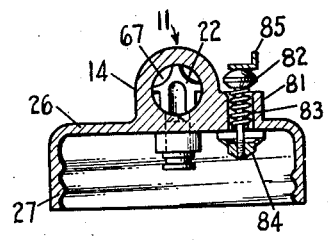
INVENTOR
SIMON DEUTSCH
BY
Cromwell, Greist & Warden
ATTORNEYS Feb. 28, 1933.  S. DEUTSCH  1,899,749
SPRAYING DEVICE
Filed Feb. 25, 1929  3 Sheets-Sheet 3
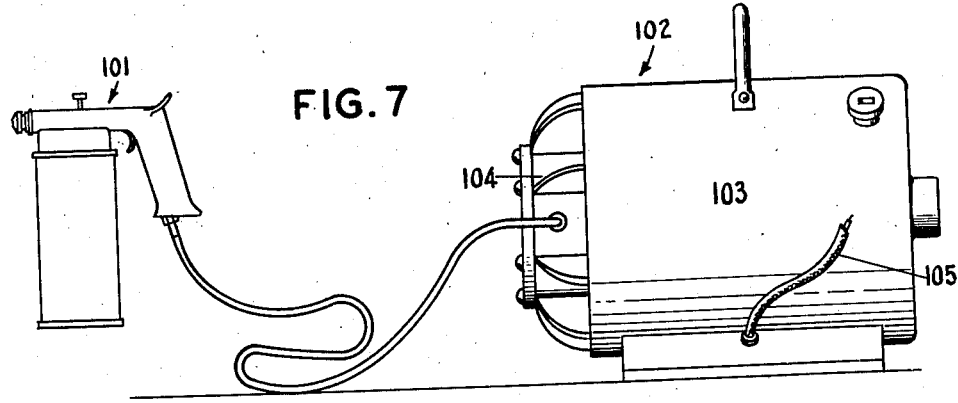
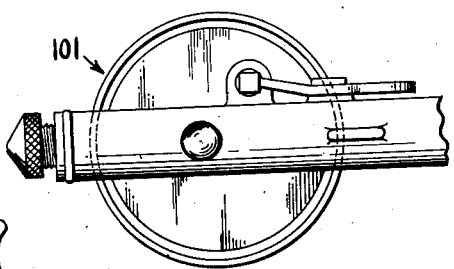
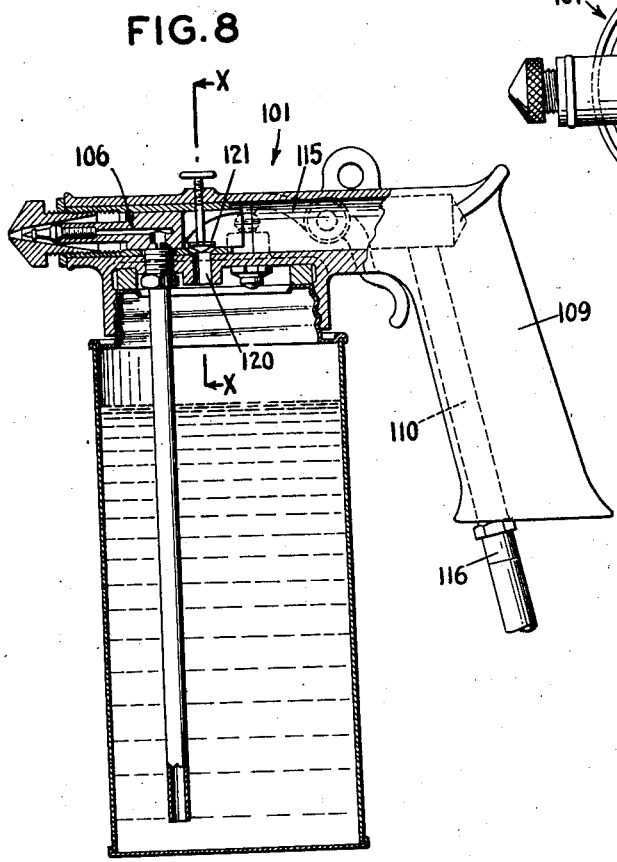
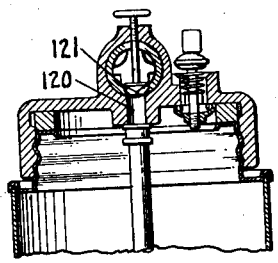
INVENTOR
SIMON DEUTSCH
BY
Cromwell, Greist & Warden
ATTORNEYS Patented Feb. 28, 1933

1,899,749

UNITED STATES PATENT OFFICE

SIMON DEUTSCH, OF SOUTH BEND, INDIANA, ASSIGNOR TO THE ELECTRIC SPRAYIT COMPANY, OF SOUTH BEND, INDIANA, A CORPORATION OF DELAWARE

SPRAYING DEVICE

Application filed February 25, 1929. Serial No. 342,611.

This invention relates to spraying devices and is an improvement in devices of the type shown in Howe Patents 1,482,747 and 1,555,287, and in my application Serial Number 288,162, filed June 25, 1928, although some of the features in my invention are not necessarily limited to such devices.

Among the objects of the invention is the provision of an economical, highly efficient and readily manipulable, portable spraying or atomizing unit for spraying and atomizing liquids such as paints or other materials of suitable character. A particular feature of the present invention is an improved arrangement of such device for automatically maintaining the material to be sprayed at a uniform consistency.

The foregoing and other features of the invention will be best understood from the following description of the exemplifications thereof, reference being had to the accompanying drawings in which Fig. 1 is a vertical sectional view of a spraying device embodying my invention;

Fig. 3 is a rear elevational view of device shown in Fig. 1;

Fig. 4 is a transverse vertical sectional view of the device along line IV—IV in Fig. 1;

Fig. 5 is a diagrammatical sectional view of the device illustrating the operation of the same during the spraying action;

Fig. 6 is a view similar to Fig. 5 illustrating the operation of the device immediately before starting or after stopping the spraying action;

Fig. 7 is a diagrammatical view of a two-unit spraying device embodying features of my invention;

Fig. 8 is a vertical sectional view through the spraying unit of Fig. 7 with the handle part thereof shown in elevation;

Fig. 9 is a top plan view of the main part of the spraying unit shown in Fig. 7;

Fig. 10 is a transverse vertical sectional view of the spraying unit along line X—X of Fig. 8.

Figure 1:
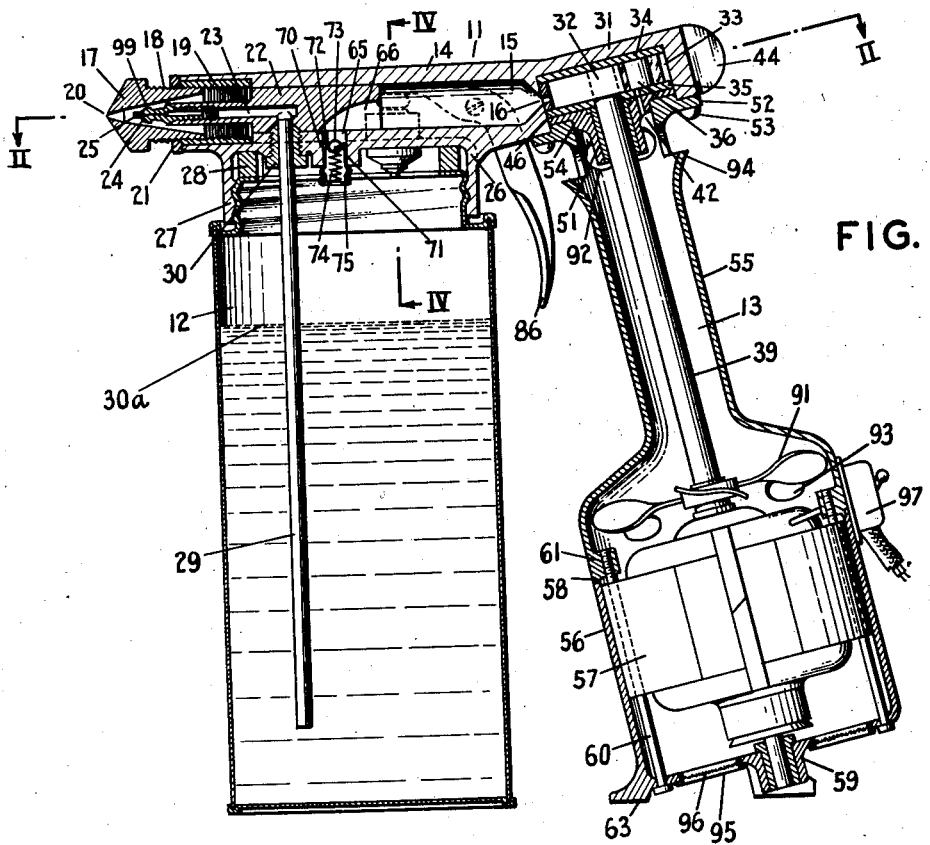
Figure 2:
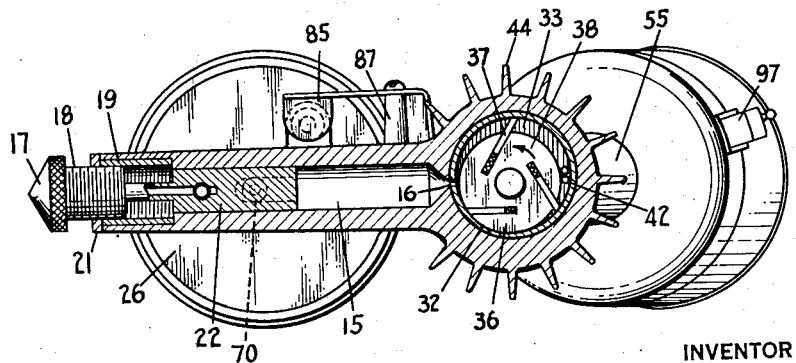
Fig. 2 is a partly horizontal sectional view along line II—II in Fig. 1.

The exemplification of my invention shown in Figs. 1 to 4 is of the single unit type in which all the parts cooperating in the spraying or atomizing action are joined in a single hand-portable unit. As shown in the drawings, the device comprises a nozzle unit 11, a spray material container 12 from which the spray material, such as paint or similar fluid, is supplied to the nozzle unit, and a compressor unit 13 by means of which there is supplied to the nozzle unit air pressure for forcing spray fluid into the nozzle unit and for discharging it therefrom in the form of a spray.

The nozzle unit 11 is made in the form of a tubular housing 14 having a longitudinal tubular chamber 15 for receiving compressed air from the compressor unit 13 through the compressed air inlet 16 at the rear end of the chamber. The front end of the nozzle chamber 15 is closed by a spray nozzle 17 having a screw-threaded shank portion 18 threaded into a cylindrical shell 19, which forms an interior lining of the front part of the nozzle chamber 15. This shell 19 may be made of a material different from the nozzle housing and is forced into the opening of the nozzle chamber 15 so as to be firmly held therein. The nozzle 17 has a nozzle or spray opening 20 and may be fixed in any longitudinal position by a lock-nut 21.

Spray material or fluid is supplied into the space immediately back of the spray opening 20 of the spray nozzle 17 by means of a spider-shaped member 22, fitting into the tubular front end of the nozzle chamber 15 and forming a fluid supply duct 23 extending towards the front against the nozzle opening. A fluid tip 24 with a relatively small tip opening 25 is screwed into the front end of the fluid supply duct 23 and forms the fluid or spray material outlet immediately back of the nozzle opening 20. At the bottom side of the nozzle unit 11 there is formed a cap or cover member 26 to which may be detachably joined, as by means of screw-threaded elements 27, the spraying material container 12, a gasket 28 securing a substantially air-tight enclosure. Liquid or spray material is carried into the supply duct 23 by means of a supply tube 29 having its upper end screw-threaded and joined to the under-side of the nozzle housing 14 by means of a flanged nipple 30, the nipple end serving also to lock in position the spider-shaped fluid supply member 22. The lower end of the supply tube 29 extends downwardly below the level 30a of the fluid till near the bottom of the container 12.

The rear end of the nozzle unit 11 forms a substantially flat cylindrical housing 31 for the compressor 32 of the compressor unit 13. Within this compressor housing 31 there is mounted a short cylindrical compressor chamber formed of a cylindrical shell 33 and upper and lower circular plates 34 and 35 enclosing the two sides of the shell.

Eccentrically positioned within this compressor chamber 33 there is a cylindrical compressor rotor 36 provided with a plurality of outwardly pressed slide plates or vanes 37 so arranged that upon the rotation of the compressor rotor 36 in the direction indicated by arrow 38, by means of shaft 39 on which it is mounted, compressed air will be obtained. The air is sucked in into the space between the vanes of the compressor through inlet opening 42 extending through the bottom side of the compressor chamber, and the compressed air is delivered into the nozzle chamber 15 through the inlet opening 16 on the cylindrical side wall of the compressor chamber.

The compressor housing 31 is formed as an integral unit with the nozzle housing 14 and is provided with a plurality of cooling fins 44 for dissipating the heat losses incident to the operation of the compressor. This combined unit forming the nozzle housing and compressor housing is preferably made of a light material such as aluminum by die casting, and the walls 33 to 35 of the compressor chamber itself are preferably made of steel so as to keep close distances between the inner walls of the compressor chamber and the rotor, in order to secure efficient compressor action.

The compressor housing 31 has an opening 46 on the under side, this opening being substantially of a diameter sufficient to clear the outside diameter of the shell 33 forming the compressor chamber so that the compressor chamber with the compressor may be inserted into place. The operating shaft 39 for the compressor extends into the compressor chamber through an opening in the bottom plate 35 and is journalled in a bearing member 51 which is held centered and fixed in place by means of a cover member 52 arranged to be secured against the lower open side of the compressor housing, as by means of screws 53. This cover member 52 has a central opening 54 for receiving the bearing 51 and shaft 39 and forms the upper end of the tubular extension 55 of the motor casing 56 housing an electric motor 57 for operating the compressor 32.

The tubular housing extension 55 is so shaped as to serve as a handle for manipulating the sprayer. The motor casing is transversely split along the line 58 so as to permit assembly of the electric motor in the lower part thereof, the lower part of the casing being a single unit and having journalled at its bottom wall 59, the other end of the shaft. The two parts of the motor casing are joined to each other by means of bolts 60 threaded into holes provided on lugs 61 on the upper part of the motor casing. Legs 63 are formed at the lower end of the motor housing to provide a stable and convenient base for the motor at substantially the lower level of the container 12 so that the spraying device may rest stably in upright position whenever it is set down.

As shown in the drawings, air from the nozzle chamber 15 may pass into the upper space of the container 12 through an opening 65, the spider 22 having a suitable hollow space 66 permitting free communication between the opening 65 and the nozzle chamber 15. There is also free communication between the space back of the nozzle opening and the nozzle chamber 15 at the rear end of the nozzle housing through free spaces 67 between the spider fins.

In the device shown in Figs. 1 to 4, the opening 65 between the nozzle chamber 15 and the upper space of the container 12 is provided with a check valve 70 so arranged that a certain amount of pressure must first build up in the nozzle chamber 15 before the valve opens and permits the entrance of compressed air into the material container 12. This check valve 70 may comprise a small cylindrical shell 71 adapted to be clamped with the opening 65 through the under side thereof. The upper side of the shell is provided with an opening 72 which forms a valve seat against which is pressed a closure ball 73 by means of a small spiral spring 74. The ball and the spring may be inserted into the shell through the bottom end thereof, a perforated closure cap 75 snapped in place serving to hold the ball and spring in position. This check valve unit 70 serves to control or regulate the flow of compressed air into the upper space of the fluid container 12. This flow may be readily adjusted by changing the pressure exercised by the spring 74 or by entirely removing the spring or by entirely eliminating the check valve and merely controlling the air flow conditions by varying the size of the opening 65 between the nozzle chamber 15 and the container space. For instance, the ball 73 and the spring 74 may be entirely removed from the shell 71 and the air flow may be controlled simply by placing within the shell a diaphragm more or less impeding the flow of air through the opening.

The cap member 26 of the nozzle unit is provided with a relief port 81 through which there may be established, at will, direct communication between the space in the upper part of the container 12 and the atmosphere. By closing or opening the relief port, the pressure conditions in the upper space of the container 12 are readily controlled. The relief port 81 may be closed by a valve 82 which is ordinarily held in open position by means of a spring 83, the outward movement of the valve being limited by cap member 84 having perforations around the periphery and serving as a splash guard. When the valve is in open position, as shown in Fig. 4, air is free to flow through the perforations of the splash guard. Upon pressing down on the valve as by means of a lever 85, communication with the atmosphere is cut off.

The opening and closure of the valve is controlled by means of a trigger 86 constituting an extension of the lever 85 and pivotally mounted on a boss 87 extending on one side of the nozzle housing. The trigger 86 is so arranged as to be conveniently operated by the hand of the operator holding the machine at the tubular extension 55 which serves as a grip for the machine.

In order to cool the compressor, a fan 91 is mounted adjacent the motor 57 within the casing. The upper end of the tubular grip member 55 is provided with openings 92 through which air propelled by the fan 91 may be discharged against the compressor housing 31 for cooling the same. A portion of the motor casing directly back of the fan is provided with air inlet ports 93 through which the air may be sucked in by the fan. The portion of the grip member 55 underneath the air outlet openings 92 is preferably flared outwardly as shown in the drawings so that the stream of air produced by the fan flows without resistance against the top of the compressor casing and against the cooling fins, securing efficient cooling action. With this arrangement a stream of cool air is produced by the fan 91, the air entering into the motor casing through the openings 93 and flowing through the interior of the tubular handle 55, maintaining the same in cool condition throughout the operation of the machine.

The flared part 94 of the grip 55 assists in securing a proper hold on the handle, the flared portion preventing the hand from slipping against the hot compressor housing and shutting up the openings 92 through which the air flow against the compressor housing takes place. With the foregoing arrangement the grip portion of the device is maintained relatively cool throughout the entire operation notwithstanding the fact that the compressor housing as well as the motor 57 have a relatively high temperature.

If desired, the fan 91 may also be used for introducing a stream of cooling air through the motor 57. In the device as shown in the drawings such action is secured by providing at the bottom of the wall of the motor housing, openings 95 so that under the action of the fan 91 air will be sucked in through said openings at the same time that air is sucked into the openings 93 immediately back of the fan. The stream of air through the openings 95 will effectively cool the motor 57. In order to keep the air flowing through the motor clean, fine mesh screens 96 are provided across said openings as shown in the drawings.

The electric motor 57 is arranged to be controlled by a suitable switch 97 as shown in the drawings, the switch lever being so disposed as to be readily controlled by the hand holding the grip member 55.

A machine of the foregoing construction is extremely simple to manufacture and assemble. The nozzle unit 11 may be completely assembled and the nozzle housing has directly and integrally joined with it the compressor housing. The motor unit may also be assembled by itself by placing the assembled motor with the fan in the lower portion of the motor casing and thereupon slipping the upper portion of the motor casing with the grip extension 55 in place and bolting the two parts of the casing together. Thereupon, the compressor 32 with the compressor chamber and the bearing member 51 are slipped in place on the upper end of the shaft 39 and the entire assembly secured in position with respect to the handle unit by clamping the two by means of the bolts 53.

In operating the device, the electrically operated switch 97 is closed so as to set the compressor 32 in operation, the compressor being left in action during the entire period of operation of the machine and not being started or stopped each time the sprayer is to be set in action or cut off. With the compressor in operation, the spraying action is controlled by closing or opening the relief valve 82 by means of the trigger 86. On closing the relief valve 82 the compressed air entering into the nozzle chamber 15 through the opening 16 builds up a high pressure within the space of the container 12 above the level 30a of the spray fluid, since the air is streaming out of the nozzle chamber only through the relatively small opening 20 of the spray nozzle 17. The compressed air in the upper portion of the container 12 forces the spray liquid into the liquid supply duct 23 and discharges it in the form of a small jet through the tip outlet opening 25. The jet of liquid is atomized by the stream of air flowing in the direction of the jet through the nozzle opening 20 and an atomized spray is thus produced through the nozzle opening.

As seen in the drawings, the fluid tip 24 is provided near its end with a conical sealing ridge 99 arranged to fit against the correspondingly shaped inner surface of the nozzle channel leading to the nozzle opening 20 so, that by the longitudinal adjustment of the nozzle 17, the opening through which the air flows against the nozzle opening may be readily regulated or entirely shut off. This sealing ridge is provided with little longitudinal grooves so that even in the closed position a limited stream of air will be passing against the nozzle opening 20. By varying the longitudinal position of the nozzle through screwing it in and out, the character of the spray and the degree of the atomization of the fluid may be readily controlled. The shape of the spray may also be varied by using nozzles having openings 20 of different shapes.

In order to stop the spraying action, the finger pressure on the trigger 86 is released whereupon the relief valve 82 opens, thereby relieving the pressure in the upper space of the container 12 and permitting compressed air from the nozzle chamber 15 to flow by way of the opening 65 and the relief valve opening 81 into the atmosphere, part of the air still flowing through the nozzle opening 20. In this way the supply of spray fluid through the tip opening 25 is stopped and only a small stream of air will continue to flow through the nozzle opening 20, keeping it clean, this stream being insufficient to draw liquid through the tip 25 by suction alone.

A distinct feature of my invention is the design of the several parts of the device in such manner as to secure automatic agitation of the liquid or spray material incident to the operation of the machine.

According to my invention, the several openings for the air and fluid streams in the spraying device, namely, the nozzle opening 20, the fluid outlet opening 25 and the compressed air inlet opening 65, are so correlated that when the relief opening 81 of the fluid container 12 is open, sufficient pressure will build up in front of the fluid outlet opening 25 back of the nozzle opening 20 to produce a back flow of air through the fluid supply duct 23 to the fluid tube 29, the air bubbling up through the liquid and stirring the spray material to maintain it in uniform consistency. The air bubbles rise through the liquid and escape through the relief port 81. We have thus, two parallel streams of air into the upper space of the container 12, one by way of the compressed air inlet openings 65 into said space, and the other by way of the fluid supply duct and supply tube 29 and through the liquid. In other words, in order to secure this second stream of air or back flow through the liquid supply duct, the pressure drop through the opening 65 must be sufficient to cause air to overcome the resistance and flow through the parallel path by way of the liquid supply duct and tube. This pressure drop through the opening 65 may be readily adjusted by varying the pressure of the valve spring 74 or by varying the width of said opening as explained before, any of the various ways for controlling the width of said opening being contemplated. By varying the width or the resistance of this compressed air inlet opening 65, the pressure drop may be readily adjusted so as to vary the degree or amount of back flow through the liquid supply tube 29 and thus controlling the degree of agitation.

The operating conditions of the device during the spraying action and the agitation in the intervals between successive spraying periods are shown in the diagrammatic Figs. 5 and 6. Fig. 5 shows the air and fluid flow conditions during the spraying period when the relief valve is closed. The compressed air builds up pressure in the space above the fluid and produces a stream of air through the nozzle tip which atomizes the jet of fluid issuing from the fluid outlet tip.

Fig. 6, illustrates the conditions upon stopping the spraying action by opening the relief valve. There is no more built up air pressure in the space above the fluid and the compressed air is free to escape from the compressed air inlet space by way of the opening 65 and the relief port, the pressure drop at the opening 65 being so adjusted as to provide sufficient pressure for producing a back flow of air through the parallel path by way of the fluid supply duct and through the liquid, thus obtaining back flow agitation of the spray fluid or material.

As pointed out above, the use of the check valve 70 in the compressed air inlet opening is not necessary to produce agitation, it being possible to secure the required pressure drop by varying the width of the opening or otherwise controlling the flow resistance through the opening. There is, however, a great advantage in the use of such valve whenever a strong agitation action is necessary. There is a further advantage in the use of such check valve 70 in that it prevents entrance of liquid or spray material in case the spraying device is tilted or dropped, it being extremely important for the satisfactory operation of the device that spray material should not enter the space within the nozzle chamber.

The arrangement of the several parts of the device as shown in Figs. 1 to 4, secures an extremely low center of gravity and greatly facilitates the employment of the relief port on the spray material container as it is important that the device be in stable equilibrium when left to itself and not fall over, spilling the spray material such as paint through the relief port. For the practical operation of the device of the character under consideration, it is of great advantage to use a continuously operating compressor and to control the spraying action by the relief valve.

The compressor action is usefully applied during the intervals between spraying periods in that the stream of air keeps clean the passages through which the spray material is flowing so that the sprayer is always ready for action. On the other hand, the control of the spraying period through the relief valve enables prompt starting and particularly prompt stopping of the spraying action, the supply of spray fluid being cut off the moment the pressure is released from the spray material container by opening the relief valve, avoiding dripping or dribbling over the spray nozzle such as occurs when the spraying action is controlled by starting or stopping the motor.

The features of back flow agitation as used in the machine described above are not limited to single unit machines in which the compressor, nozzle unit and spray material container are combined into a single unit, but are also of usefulness and applicable to spraying or atomizing devices in which the several parts are distinct and separate. A two-unit machine embodying this feature of my invention is shown in Figs. 7 to 10.

As shown in the drawings, the machine comprises a spraying unit 101 and a separate compressor unit 102. The compressor unit is shown in the form of a small self-contained electric motor 103 carrying at one end a compressor 104 which is driven by the shaft of the motor. The motor is supplied with current by a suitable cable 105 and may be energized for instance, as shown in Howe Patent 1,555,287.

The spraying unit 101 comprises essentially a spraying nozzle unit 106 which is shown in detail in Figs. 8 to 10 and has the several parts thereof arranged substantially in the same way as the spraying device shown in Figs. 1 to 4 except that the rear end of the nozzle chamber is not joined directly to the compressor unit but is provided with a pistol grip 109 by means of which the spraying unit is handled. This pistol grip is provided with a compressed air conduit 110 through which compressed air is supplied to the nozzle chamber 115, a hose connection 116 connecting the compressed air inlet at the lower end of the pistol grip with the compressed air outlet of the compressor 104.

In this two-unit arrangement, the compressed air inlet opening 120 between the nozzle chamber 115 and the space above the fluid in the container is not provided with a check valve as in the unit shown in Figs. 1 to 4, but has an adjustable valve 121 permitting variation of the size of the opening. As in the arrangement shown in Figs. 1 to 4, the compressor is maintained in action during the entire spraying operation and the spraying action is controlled by closing and opening the relief valve. During the spraying period, when the relief valve is closed, compressed air entering into the spray fluid container above the spray fluid forces the fluid through the liquid outlet tip, and the compressed air flowing through the nozzle opening atomizes the fluid into a spray. Upon opening the relief valve the spraying action is immediately stopped and there is produced a back flow of air through the liquid supply tube and the liquid, agitating the same and maintaining its consistency uniform.

While the spraying devices of my invention described above are intended principally for spraying and atomizing liquids, the features are not necessarily limited to devices using liquid materials only but are useful in many other applications.

The term "compressed air" or "air" as used herein, is not intended to limit the devices to the use of atmospheric air but is intended to express broadly any gaseous fluid suitable for use as an atomizing medium in the same sense as the application of air is described herein.

The invention is not limited to the particular details of construction or arrangements or methods of operation described hereinbefore, but many modifications thereof will suggest themselves to those skilled in the art. It is accordingly desired that the appended claims be given a broad construction commensurate with the scope of the invention within the art.

What I claim is:

1. In an atomizing device, a container for liquid to be atomized, a compressed fluid discharge duct, a discharge nozzle at the end of said duct, a liquid discharge duct extending from near the bottom of said container into said fluid discharge duct and having a discharge tip back of the opening of said nozzle, a source of compressed fluid, means for producing a continuous flow of said fluid into said fluid discharge duct and said container, and valve means for controlling the pressure conditions in said container to cause liquid from said container to be discharged through said tip or to cause fluid from said duct to flow in a reverse direction through said liquid discharge duct into said container.

2. In an atomizing device, a container for liquid to be atomized, a compressed fluid discharge duct, a discharge nozzle at the end of said duct, a liquid discharge duct extending from near the bottom of said container into said fluid discharge duct and having a discharge tip opening back of said nozzle, a source of compressed fluid, means for continuously supplying compressed fluid to to said fluid discharge duct, means for supplying compressed fluid from said source to the top space of said container, a valve means on said container to control the pressure conditions thereof, said compressed fluid supply means for said container, said nozzle, and said discharge tip being so arranged that upon closure of said valve means, said pressure fluid forces said liquid through said tip and produces atomization thereof through said nozzle, and opening of said valve means causes part of said fluid to flow in reverse direction through said fluid discharge duct and another part of said fluid to flow through said nozzle.

3. In an atomizing device, a container for liquid to be atomized, a compressed fluid discharge duct, a discharge nozzle at the end of said duct, a liquid discharge duct extending from near the bottom of said container into said fluid discharge duct and having a discharge tip opening back of said nozzle, a source of compressed fluid, means for continuously supplying compressed fluid to said fluid discharge duct, means for supplying compressed fluid from said source to the top space of said container, a valve means on said container to control the pressure conditions thereof, said compressed fluid supply means for said container, said nozzle, and said discharge tip being so arranged that upon closure of said valve means, said pressure fluid forces said liquid through said tip and produces atomization thereof through said nozzle, and opening of said valve means causes said fluid to flow from said fluid duct by way of said tip and said liquid discharge duct into said container in a direction opposite to the flow of liquid therethrough.

4. In a spraying device, a liquid reservoir, a pressure chamber having a spray nozzle, a liquid delivery duct extending from below the liquid level in said reservoir and having at its end a liquid discharge tip within said pressure chamber in cooperative relation with said nozzle, means for supplying compressed gas to said pressure chamber, a gas port extending between said pressure chamber and the space above the liquid level of said reservoir, a relief valve for controlling the pressure conditions in the space above the liquid level in said reservoir, said gas port and the openings in said nozzle and said liquid tip being so proportioned that with a continuous supply of compressed gas to said pressure chamber there is a flow of gas in part out through said nozzle, in part into said liquid tip down said liquid supply duct and up through the liquid in said reservoir and out through said relief valve when said relief valve is open, and when said relief valve is closed, gas enters the top of said reservoir through said gas port to force liquid up to and through said liquid tip while the bulk of the gas is ejected through said nozzle to convert the liquid into a spray.

5. In an atomizing device, a closed container with liquid to be atomized, a compressed fluid discharge duct, a nozzle at the end of said duct, a liquid discharge tip within said fluid discharge duct opening in the direction of said nozzle, a liquid supply duct extending from said tip into said container below the level of the liquid, a source of compressed fluid connected to said fluid discharge duct, a valve-controlled relief port on said container for controlling the pressure conditions thereof, and a port of adjustably variable flow resistance connecting said source of compressed air and the container space above the liquid level.

6. A hand-portable spraying machine comprising a compressor unit including an electric motor and an air compressor driven by said motor, said motor having an enclosure surrounding its interior, a compressed air supply duct connected to said compressor, a spray unit at the end of said duct, a container for liquid to be sprayed joined to said duct and connected to cause compressed air supplied by said compressor to atomize liquid from said container through said spray unit, and a fan on said compressor unit driven by said motor and mounted to suck cooling air from the space outside said motor and discharge it over said compressor without passing it through the interior of said motor.

7. A hand-portable spraying unit comprising a gas discharge duct having a spray nozzle at its end, a liquid reservoir, a liquid supply tube extending from said reservoir into said duct and terminating in a discharge tip back of said nozzle, a source of compressed gas connected to said duct and said reservoir to supply compressed gas thereto, a single valve for controlling the pressure in said container manipulable into either of two positions, closed and open, to effect when closed a forcible discharge of a spray of liquid from said spray nozzle and when open a substantially instantaneous cessation of said spray and the substitution therefor of a discharge of gas through said nozzle and a reverse flow of gas through said liquid supply tube to effect agitation of the liquid within said reservoir.

In testimony whereof, I have hereunto subscribed my name this 12th day of February 1929.

SIMON DEUTSCH.